(12) United States Patent
Tokieda et al.

(10) Patent No.: US 11,992,856 B2
(45) Date of Patent: May 28, 2024

(54) INTERMITTENT VALVE DEVICE AND INTERMITTENT COATING DEVICE

(71) Applicant: Panasonic Intellectual Property Management Co., Ltd., Osaka (JP)

(72) Inventors: Daisuke Tokieda, Kyoto (JP); Yuta Fukutomi, Osaka (JP); Naoyuki Koide, Hyogo (JP); Yoshinori Sakai, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/291,555

(22) PCT Filed: Nov. 29, 2019

(86) PCT No.: PCT/JP2019/046698
§ 371 (c)(1),
(2) Date: May 5, 2021

(87) PCT Pub. No.: WO2020/129570
PCT Pub. Date: Jun. 25, 2020

(65) Prior Publication Data
US 2022/0023909 A1      Jan. 27, 2022

(30) Foreign Application Priority Data
Dec. 18, 2018   (JP) .................................. 2018-236659

(51) Int. Cl.
*B05C 11/10*    (2006.01)
*B05C 5/02*    (2006.01)
(Continued)

(52) U.S. Cl.
CPC ............ *B05C 11/1026* (2013.01); *B05C 5/02* (2013.01); *H01M 4/0411* (2013.01); *H01M 4/139* (2013.01); *H01M 10/0525* (2013.01)

(58) Field of Classification Search
USPC ................. 118/300, 410, 684, 683, 602, 325
See application file for complete search history.

(56) References Cited

U.S. PATENT DOCUMENTS 1,451,544 A * 4/1923 Hellmund .............. H01H 33/52
                                                      200/82 R
4,466,378 A * 8/1984 Rogers .................... B05C 11/10
                                                      118/411
(Continued)

FOREIGN PATENT DOCUMENTS

JP       2000-033315 A     2/2000
JP       2006-051407 A     2/2006
(Continued)

OTHER PUBLICATIONS

International Search Report issued in corresponding International Patent Application No. PCT/JP2019/046698, dated Dec. 24, 2019, with Englishn translation.

Primary Examiner — Yewebdar T Tadesse
(74) Attorney, Agent, or Firm — Rimon P.C.

(57) ABSTRACT

An intermittent valve device includes: an intermittent valve capable of switching between a first state in which a coating material is supplied to a die that applies the coating material onto a material to be coated and a second state in which the supply of the coating material is stopped; and a drive unit that switches the first state and the second state of the intermittent valve. The drive unit includes a cam that rotates in one direction with a circumferential surface of the cam connected to the intermittent valve. The cam includes, on the circumferential surface, a first shape part that places the intermittent valve in the first state, and a second shape part that places the intermittent valve in the second state.

6 Claims, 3 Drawing Sheets

(51) Int. Cl.
 *H01M 4/04* (2006.01)
 *H01M 4/139* (2010.01)
 *H01M 10/0525* (2010.01)

(56) References Cited

U.S. PATENT DOCUMENTS

| | | |
|---|---|---|
| 10,814,345 B2 | 10/2020 | Hidaka |
| 2019/0210058 A1 | 7/2019 | Hidaka |

FOREIGN PATENT DOCUMENTS

| | | | |
|---|---|---|---|
| JP | 2010-108678 A | | 5/2010 |
| JP | 2013-071044 A | | 4/2013 |
| JP | 2016147216 A | * | 8/2016 |
| JP | 2016-185504 A | | 10/2016 |
| JP | 2017-192906 A | | 10/2017 |
| JP | 2018-069221 A | | 5/2018 |
| WO | WO2018/034102 A1 | | 2/2018 |

* cited by examiner

INTERMITTENT VALVE DEVICE AND INTERMITTENT COATING DEVICE

CROSS-REFERENCE TO RELATED APPLICATIONS

This application is the U.S. National Phase under 35 U.S.C. § 371 of International Patent Application No. PCT/JP2019/046698, filed on Nov. 29, 2019, which in turn claims the benefit of priority from the prior Japanese Patent Application No. 2018-236659, filed on Dec. 18, 2018, the entire disclosures of which Applications are incorporated herein by reference.

BACKGROUND

Field of the Invention

The present disclosure relates to an intermittent valve device and an intermittent coating device.

Description of the Related Art

In recent years, with widespread use of electric vehicles (EV), hybrid vehicles (HV), and plug-in hybrid vehicles (PHV), for example, shipment of secondary batteries has been increasing. Particularly, lithium-ion secondary batteries are increasingly shipped. A general secondary battery mainly includes a positive plate, a negative plate, a separator, and an electrolyte as constituting elements. An electrode plate, such as the positive plate or negative plate, has a structure in which an electrode active material is laminated on a surface of a current collector made of metallic foil.

As a method for manufacturing such an electrode plate, a method has been conventionally known in which electrode slurry is intermittently applied on a surface of elongated metallic foil using an intermittent coating device that includes a die used to discharge electrode slurry obtained by mixing an active material and a solvent, and an intermittent valve used to switch supply and non-supply of the electrode slurry to the die (see Patent Literature 1, for example).

Patent Literature 1: Japanese Unexamined Patent Application Publication No. 2010-108678

With the increasing shipment of secondary batteries, there is a need to reduce manufacturing time of electrode plates. However, if electrode slurry is intermittently applied on metallic foil at high speed so as to reduce the manufacturing time of electrode plates, accuracy of applying the electrode slurry may be lowered because of responsiveness limitation of the intermittent valve. The lowered application accuracy may cause degradation in quality of electrode plates.

SUMMARY OF THE INVENTION

The present disclosure has been made in view of such a situation, and a purpose thereof is to provide a technology for enabling both the reduction of manufacturing time and the quality maintenance of electrode plates.

One embodiment of the present disclosure relates to an intermittent valve device. The intermittent valve device includes: an intermittent valve capable of switching between a first state in which a coating material is supplied to a die that applies the coating material onto a material to be coated and a second state in which the supply of the coating material is stopped; and a drive unit that switches the first state and the second state of the intermittent valve. The drive unit includes a cam that rotates in one direction with a circumferential surface of the cam connected to the intermittent valve. The cam includes, on the circumferential surface, a first shape part that places the intermittent valve in the first state, and a second shape part that places the intermittent valve in the second state.

Another embodiment of the present disclosure relates to an intermittent coating device. The intermittent coating device includes: a die used to apply a coating material onto a material to be coated; and the intermittent valve device according to the one embodiment that switches supply and non-supply of the coating material to the die.

Optional combinations of the aforementioned constituting elements, and implementation of the present disclosure, including the expressions, in the form of methods, apparatuses, or systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

In the following, the present disclosure will be described based on a preferred embodiment with reference to the drawings. The embodiment is intended to be illustrative only and not to limit the invention, so that it should be understood that not all of the features or combinations thereof described in the embodiment are necessarily essential to the invention. Like reference characters denote like or corresponding constituting elements, members, and processes in each drawing, and repetitive description will be omitted as appropriate.

Also, the scale or shape of each component shown in each drawing is defined for the sake of convenience to facilitate the explanation and is not to be regarded as limitative unless otherwise specified. Also, when the terms "first", "second", and the like are used in the present specification or claims, such terms do not imply any order or degree of importance and are used to distinguish one configuration from another, unless otherwise specified. Further, in each drawing, part of a member less important in describing the embodiment may be omitted.

Figure 1:
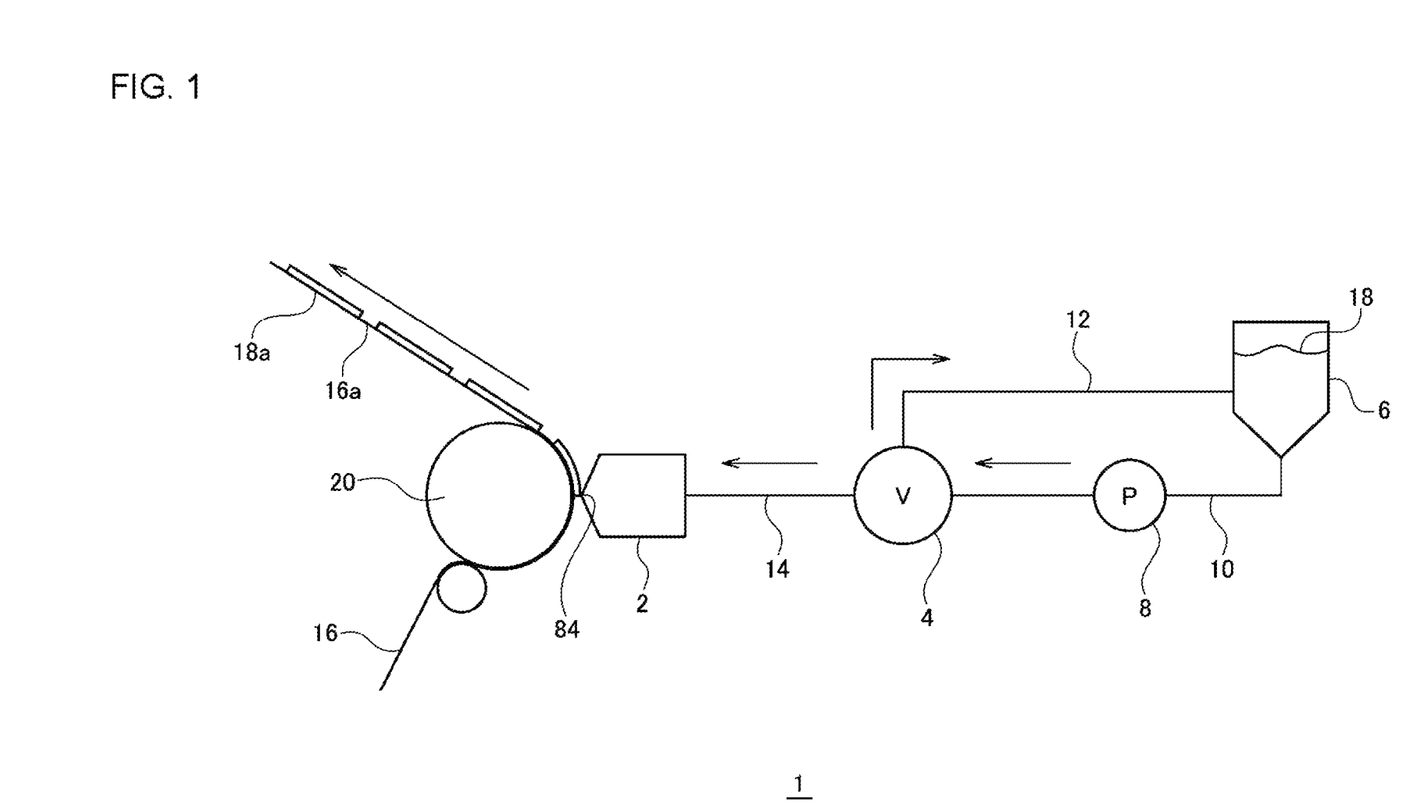
FIG. 1 is a schematic diagram of an intermittent coating device according to an embodiment.

FIG. 1 is a schematic diagram of an intermittent coating device according to an embodiment. An intermittent coating device 1 includes a die 2, an intermittent valve device 4, a tank 6, a pump 8, a feed pipe conduit 10, a return pipe conduit 12, and a die supply pipe conduit 14.

The die 2 is a tool used to apply a coating material 18 onto a material 16 to be coated. The intermittent coating device 1 according to the present embodiment is used to manufacture electrode plates of secondary batteries. An electrode plate of a secondary battery is a sheet electrode material obtained by drying a current collector on which electrode slurry is applied. Accordingly, in the present embodiment, the material 16 to be coated is a current collector of a secondary battery, and the coating material 18 is electrode slurry of a secondary battery. The current collector may be metallic foil, for example. The electrode slurry may be a mixture of a positive-electrode active material or a negative-electrode active material and a solvent, for example. In the case of a general lithium-ion secondary battery, the positive electrode plate is prepared by applying slurry containing a positive-electrode active material, such as lithium cobalt oxide and lithium iron phosphate, onto aluminum foil. Also, the negative electrode plate is prepared by applying slurry containing a negative-electrode active material, such as graphite, onto copper foil.

The die 2 is disposed such that a discharge port 84 thereof faces a circumferential surface of a backup roll 20 with a certain space therebetween. The material 16 to be coated is continuously conveyed by means of rotation of the backup roll 20 to the position where the backup roll 20 and the discharge port 84 face each other.

To the die 2, the intermittent valve device 4 is connected via the die supply pipe conduit 14. The intermittent valve device 4 is a device that switches supply and non-supply of the coating material 18 to the die 2. While the coating material 18 is supplied to the die 2, the intermittent coating device 1 can discharge the coating material 18 from the die 2 onto the material 16 to be coated. To the intermittent valve device 4, the tank 6 is connected via the feed pipe conduit 10 and the return pipe conduit 12.

The tank 6 stores the coating material 18. On the feed pipe conduit 10, the pump 8 is provided. With the pump 8 driven, the coating material 18 is fed from the tank 6 to the intermittent valve device 4. The intermittent valve device 4 supplies the coating material 18 from the tank 6 to the die 2 through the die supply pipe conduit 14. Also, the intermittent valve device 4 returns the coating material 18 from the tank 6 to the tank 6 through the return pipe conduit 12.

The intermittent valve device 4 supplies the coating material 18 to the die 2, which discharges the coating material 18, so that an applied part 18a of the coating material 18 can be formed on the material 16 to be coated. Also, the intermittent valve device 4 returns the coating material 18 to the tank 6, and the application of the coating material 18 supplied from the die 2 is stopped, so that an unapplied part 16a of the coating material 18 can be formed on the material 16 to be coated. In other words, with the intermittent valve device 4, intermittent coating of the coating material 18 can be performed on the material 16 to be coated. The unapplied part 16a is used for pasting of the center lead of an electrode, for example.

Figure 2:
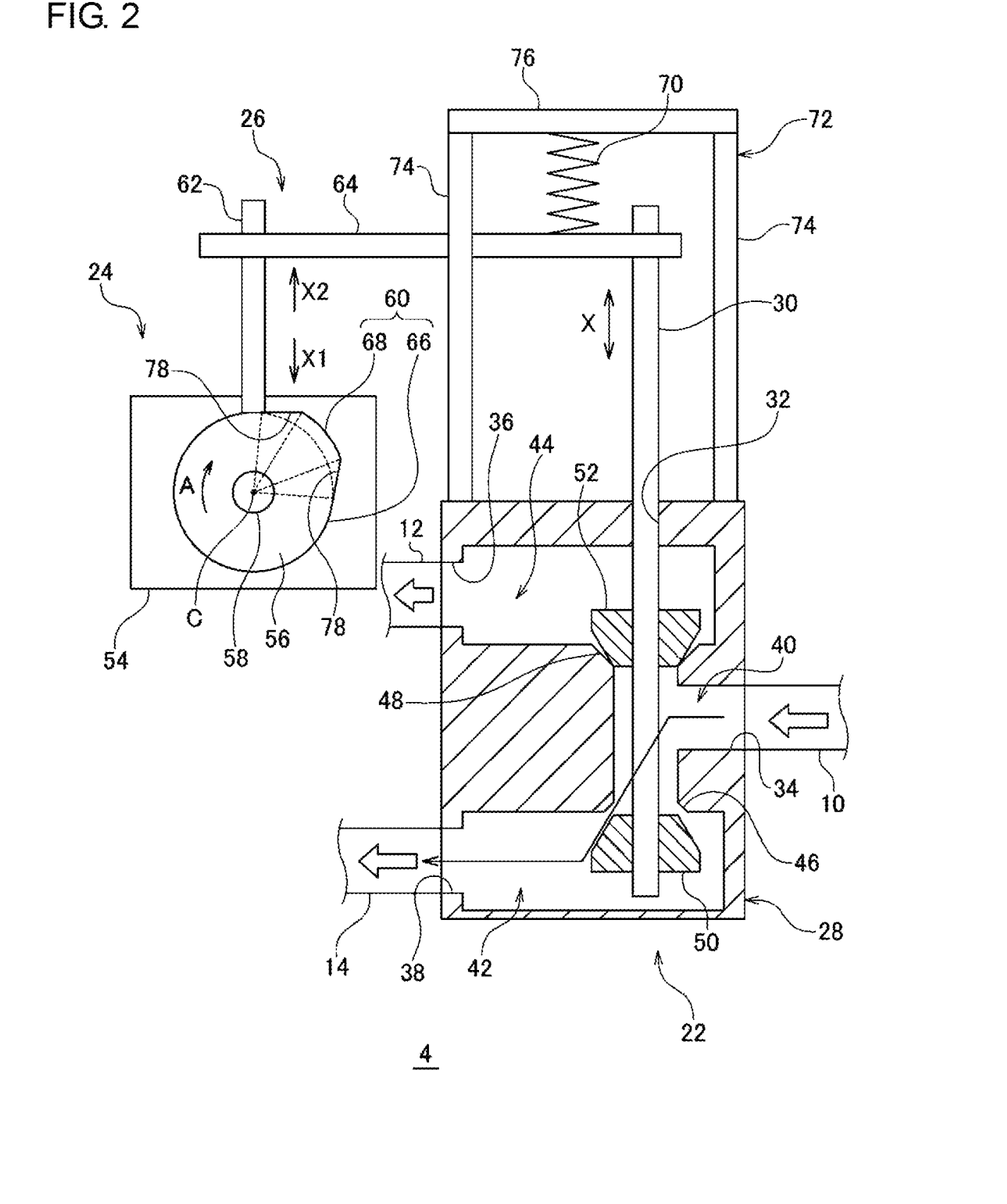
FIG. 2 is a side view that illustrates a schematic structure of an intermittent valve device.

FIG. 2 is a side view that illustrates a schematic structure of the intermittent valve device. FIGS. 3A-3D are schematic diagrams that each illustrate a rotating state of a cam. FIG. 2 illustrates a cross section of an intermittent valve. The intermittent valve device 4 includes an intermittent valve 22, a drive unit 24, and a connection part 26.

The intermittent valve 22 includes a cylinder 28 and a piston 30. The cylinder 28 includes, on the upper surface thereof, a first opening 32 through which the piston 30 is slidably inserted. The cylinder 28 also includes, on the side surfaces thereof, a second opening 34 to which the feed pipe conduit 10 is connected, a third opening 36 to which the return pipe conduit 12 is connected, and a fourth opening 38 to which the die supply pipe conduit 14 is connected. The cylinder 28 also includes therewithin a branch flow passage 40, a die flow passage 42, and a tank flow passage 44. One end of the branch flow passage 40 is connected to the second opening 34. The other end of the branch flow passage 40 is branched into two; one of the branched ends is connected to one end of the die flow passage 42, and the other of the branched ends is connected to one end of the tank flow passage 44. The other end of the die flow passage 42 is connected to the fourth opening 38, and the other end of the tank flow passage 44 is connected to the third opening 36.

The first opening 32 of the cylinder 28, a first connection part 46 at which the branch flow passage 40 and the die flow passage 42 are connected, and a second connection part 48 at which the branch flow passage 40 and the tank flow passage 44 are connected are arranged such as to lie on a straight line. The first opening 32, the second connection part 48, and the first connection part 46 are arranged in this order. One end side of the piston 30 is inserted through the first opening 32, the second connection part 48, and the first connection part 46.

On the piston 30, a first valve plug 50 is provided near the first connection part 46. Also, on the piston 30 near the second connection part 48, a second valve plug 52 is provided. The first valve plug 50 and the second valve plug 52 are arranged such that the distance therebetween is larger than the distance between the first connection part 46 and the second connection part 48 along a stem direction X of the piston 30.

By shifting the piston 30 along a stem direction X with respect to the cylinder 28, the position of the piston 30 can be changed to a first position and a second position. When the piston 30 is shifted into the cylinder 28 from the second position, the piston 30 is set to the first position; when the piston 30 is shifted out of the cylinder 28 from the first position, the piston 30 is set to the second position. FIG. 2 illustrates the piston 30 located at the first position.

When the piston 30 is located at the first position, a space is formed between the first valve plug 50 and the first connection part 46, so that the branch flow passage 40 and the die flow passage 42 communicate with each other. Meanwhile, the second valve plug 52 is fitted to the second connection part 48. In other words, the second connection part 48 functions as a valve seat for the second valve plug 52. Accordingly, the branch flow passage 40 and the tank flow passage 44 are blocked.

When the piston 30 is located at the second position, the first valve plug 50 is fitted to the first connection part 46. In other words, the first connection part 46 functions as a valve seat for the first valve plug 50. Accordingly, the branch flow passage 40 and the die flow passage 42 are blocked. Meanwhile, a space is formed between the second valve plug 52 and the second connection part 48, so that the branch flow passage 40 and the tank flow passage 44 communicate with each other.

When the piston 30 is located at the first position, the intermittent valve 22 is placed in a first state. Also, when the piston 30 is located at the second position, the intermittent valve 22 is placed in a second state. The first state of the intermittent valve 22 is a state where the coating material 18 is supplied to the die 2. On the other hand, the second state of the intermittent valve 22 is a state where the supply of the coating material 18 to the die 2 is stopped.

More specifically, when the intermittent valve 22 is placed in the first state, the piston 30 is set to the first position, so that the branch flow passage 40 and the die flow passage 42 communicate with each other while the branch flow passage 40 and the tank flow passage 44 are blocked. Accordingly, the coating material 18 flowing into the branch flow passage 40 from the feed pipe conduit 10 via the second opening 34 is supplied to the die 2 via the die flow passage 42, the fourth opening 38, and the die supply pipe conduit 14. When the intermittent valve 22 is placed in the second state, on the other hand, the piston 30 is set to the second position, so that the branch flow passage 40 and the die flow passage 42 are blocked while the branch flow passage 40 and the tank flow passage 44 communicate with each other. Accordingly, the coating material 18 flowing into the branch flow passage 40 from the feed pipe conduit 10 via the second opening 34 is returned to the tank 6 via the tank flow passage 44, the third opening 36, and the return pipe conduit 12.

The drive unit 24 is a mechanism that switches the first state and the second state of the intermittent valve 22. The drive unit 24 includes a motor 54 and a cam 56. The motor 54 is constituted by a servomotor or the like. The motor 54 includes a motor shaft 58. The cam 56 has a discoid shape and is connected to the motor shaft 58. The cam 56 rotates in one direction by means of the motor 54. In the present embodiment, the cam 56 rotates in a rotating direction A. A circumferential surface 60 of the cam 56 is connected to the intermittent valve 22 via the connection part 26.

The connection part 26 connects the cam 56 of the drive unit 24 and the piston 30 of the intermittent valve 22. The connection part 26 in the present embodiment includes a first connection member 62 extending in a stem direction X of the piston 30, and a second connection member 64 extending in a direction that intersects the stem direction X. The first connection member 62 is disposed such that one end thereof is in contact with the circumferential surface 60 of the cam 56. The other end of the first connection member 62 is fixed to one end of the second connection member 64. The other end of the second connection member 64 is fixed to an end part of the piston 30 protruding from the cylinder 28. The connection part 26 can be shifted integrally with the piston 30 along a stem direction X of the piston 30. The direction in which the first connection member 62 extends from the second connection member 64 toward the cam 56 is identical with the direction in which the piston 30 extends from the second connection member 64 toward the cylinder 28.

The cam 56 includes, on the circumferential surface 60, a first shape part 66 that places the intermittent valve 22 in the first state, and a second shape part 68 that places the intermittent valve 22 in the second state. The circumferential surface 60 in the present embodiment is constituted by one first shape part 66 and one second shape part 68. The first shape part 66 and the second shape part 68 are different in distance from the center C of the cam 56, or from the motor shaft 58. More specifically, the first shape part 66 is nearer from the center C than the second shape part 68, and the second shape part 68 is farther from the center C than the first shape part 66. Accordingly, the circumferential surface 60 is constituted by the first shape part 66 shaped almost in an exact circle, and the second shape part 68 shaped to protrude from the circumference of the exact circle.

As the first connection member 62 is brought into contact with the first shape part 66, the connection part 26 is shifted in a first direction X1. Accordingly, the piston 30 is also shifted in the first direction X1 to the first position. As a result, the intermittent valve 22 is placed in the first state. Meanwhile, as the first connection member 62 is brought into contact with the second shape part 68, the connection part 26 is shifted in a second direction X2. Accordingly, the piston 30 is also shifted in the second direction X2 to the second position. As a result, the intermittent valve 22 is placed in the second state. In the present embodiment, the first direction X1 is a direction in which the first connection member 62 gets closer to the center C of the cam 56, and the second direction X2 is a direction in which the first connection member 62 gets away from the center C of the cam 56. Also, in the present embodiment, the first direction X1 is a downward direction, and the second direction X2 is an upward direction.

Figure 3A:
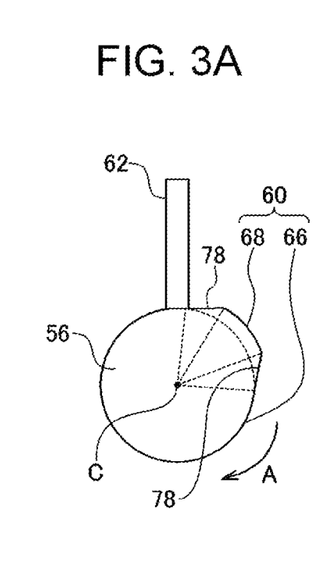
FIGS. 3A-3D are schematic diagrams that each illustrate a rotating state of a cam.
Figure 3B:
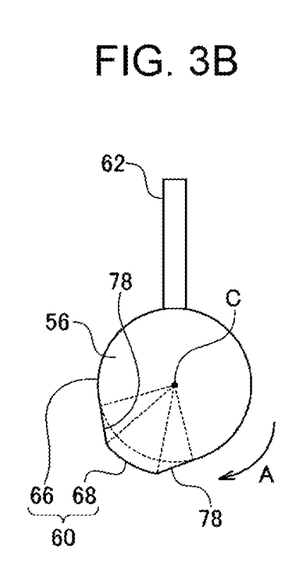

For example, it is assumed here that the cam 56 rotates while the first connection member 62 is in contact with the first shape part 66 of the circumferential surface 60, as illustrated in FIG. 3A. As the cam 56 rotates, the contact position of the first connection member 62 on the circumferential surface 60 is shifted within the first shape part 66, as illustrated in FIG. 3B.

Figure 3C:
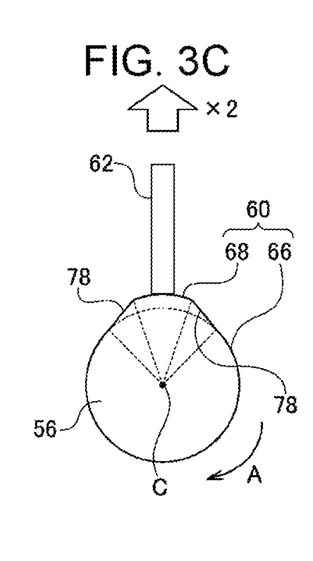

When the cam 56 further rotates and the contact position of the first connection member 62 on the circumferential surface 60 is shifted from the first shape part 66 to the second shape part 68, the first connection member 62 is shifted in the second direction X2 to be away from the center C of the cam 56, as illustrated in FIG. 3C. With the shift of the first connection member 62, the second connection member 64 and the piston 30 are also shifted in the second direction X2 in the same way as the first connection member 62. Accordingly, the piston 30 is shifted in a direction of getting out of the cylinder 28 and set to the second position. Thus, the second shape part 68 can place the intermittent valve 22 in the second state.

Figure 3D:
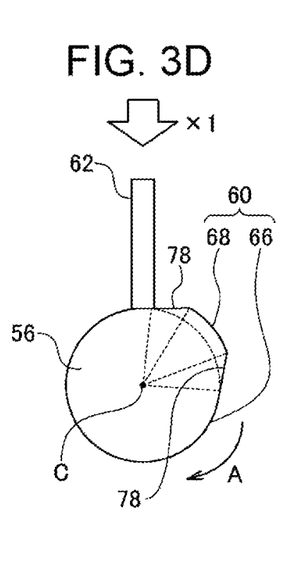

When the cam 56 further rotates and the contact position of the first connection member 62 on the circumferential surface 60 is shifted from the second shape part 68 to the first shape part 66, the first connection member 62 is shifted in the first direction X1 to be closer to the center C of the cam 56, as illustrated in FIG. 3D. With the shift of the first connection member 62, the second connection member 64 and the piston 30 are also shifted in the first direction X1 in the same way as the first connection member 62. Accordingly, the piston 30 is shifted in a direction of entering the cylinder 28 and set to the first position. Thus, the first shape part 66 can place the intermittent valve 22 in the first state. Therefore, the intermittent coating device 1 can form the applied parts 18a (or the unapplied parts 16a) at equal intervals, in synchronization with the rotation of the cam 56.

Also, the intermittent valve device 4 includes a biasing member 70 that biases the connection part 26 toward the cam 56, i.e., in the first direction X1. For example, the biasing member 70 may be constituted by a spring, such as a coil spring. In the present embodiment, the biasing member 70 is supported by a support frame 72. The support frame 72 includes multiple support posts 74 and a top board 76. Each support post 74 extends along a stem direction X of the piston 30, and one end of the support post 74 is connected to the cylinder 28. Each support post 74 extends to a position that is farther from the cylinder 28 than the second connection member 64. The top board 76 extends parallel with the second connection member 64 and is fixed to the other end of each support post 74. The connection part between the piston 30 and the second connection member 64 is surrounded by the support frame 72.

The biasing member 70 is disposed between the second connection member 64 and the top board 76. One end of the biasing member 70 is fixed to the top board 76, and the other end of the biasing member 70 is fixed to the second connection member 64. The biasing member 70 is supported by the top board 76 and biases the second connection member 64 in the first direction X1. With the second connection member 64 biased by the biasing member 70 in the first direction X1, the first connection member 62 and the piston 30 are also biased in the first direction X1. Accordingly, to be shifted in the second direction X2, the connection part 26 and the piston 30 are shifted in a direction toward the top board 76 against the biasing force of the biasing member 70. Also, the connection part 26 and the piston 30 are shifted in the first direction X1 by means of their own weights and the biasing force of the biasing member 70. Accordingly, the biasing force of the biasing member 70 assists the piston 30 in shifting from the second position to the first position. The piston 30 may include therein a biasing member (not illustrated) for biasing the piston 30 itself in the first direction X1. In this case, the posture of the intermittent valve 22 may be determined such that a stem direction X extends horizontally, for example.

The cam 56 also includes an opening degree adjuster 78 in a region of the first shape part 66 in contact with the second shape part 68. In the first shape part 66, the opening degree adjuster 78 is provided in each of a region in contact with the starting end part of the second shape part 68 and a region in contact with the termination end part of the second shape part 68, with respect to the rotating direction A of the cam 56. Each opening degree adjuster 78 is tilted such that the distance from the center C gradually changes toward the second shape part 68. In other words, each opening degree adjuster 78 is provided at a boundary between the first shape part 66 and the second shape part 68 such that no step part is formed on the circumferential surface 60, or such that the first shape part 66 and the second shape part 68 are smoothly continuous with each other.

With the opening degree adjusters 78 provided, abrasion of the cam 56 and the first connection member 62 can be restrained. Meanwhile, the end part of the first connection member 62 in contact with the circumferential surface 60 is shifted from the second shape part 68 to the first shape part 66 through the opening degree adjuster 78, so that the first connection member 62 is gradually shifted in the first direction X1. Accordingly, the piston 30 is also gradually shifted from the second position to the first position. Also, the space between the first valve plug 50 and the first connection part 46 gradually becomes larger. Therefore, when the intermittent valve device 4 is switched from the second state to the first state, an abrupt increase in the amount of the coating material 18 discharged from the die 2 can be restrained. As a result, a change of the thickness of an applied part 18a in a boundary region between the applied part 18a and an unapplied part 16a can be restrained.

As described above, the intermittent valve device 4 of the present embodiment includes: the intermittent valve 22 capable of switching between the first state in which the coating material 18 is supplied to the die 2 that applies the coating material 18 onto the material 16 to be coated and a second state in which the supply of the coating material 18 to the die 2 is stopped; and the drive unit 24 that switches the first state and the second state of the intermittent valve 22. The drive unit 24 includes the cam 56 that rotates in one direction with the circumferential surface 60 connected to the intermittent valve 22. The cam 56 includes, on the circumferential surface 60, the first shape part 66 that places the intermittent valve 22 in the first state, and the second shape part 68 that places the intermittent valve 22 in the second state. Also, the intermittent coating device 1 of the present embodiment includes: the die 2 used to apply the coating material 18 onto the material 16 to be coated; and the intermittent valve device 4 according to the present embodiment.

In the case of a conventional intermittent valve, by switching normal rotation and reverse rotation of a motor connected to the piston via a crank, supply and non-supply of the coating material to the die is switched. With the configuration of repetitively switching the motor rotation in opposite directions, it is difficult to increase the switching speed to a speed required to enable high-speed intermittent application of a coating material. If the supply and non-supply of the coating material to the die cannot be switched at high speed, accuracy of applying the coating material onto a material to be coated may be lowered. More specifically, if the conveying speed of the material to be coated is increased for high-speed intermittent coating, the time spent for formation of an unapplied part will be reduced. In this case, if the speed of switching the supply and non-supply of the coating material is not sufficient, differences in dimensions of unapplied parts will be large.

In the intermittent valve device 4 of the present embodiment, on the other hand, by rotating, in the same direction, the cam 56 having the first shape part 66 and the second shape part 68 on the circumferential surface 60, the supply and non-supply of the coating material 18 to the die 2 is switched with the rotation period of the cam 56. Accordingly, compared to the configuration of switching the rotating direction of the motor, the speed of switching the supply and non-supply of the coating material 18 to the die 2 can be increased. This can reduce the time for which the intermittent valve device 4 is placed in the second state, thereby responding to the reduction of the time for formation of an unapplied part 16a. As a result, while the accuracy of applying the coating material 18 is maintained, high-speed intermittent coating is enabled. Therefore, with the intermittent valve device 4 and the intermittent coating device 1 according to the present embodiment, both the reduction of manufacturing time and the quality maintenance of electrode plates can be achieved.

The intermittent valve 22 in the present embodiment includes the piston 30 of which the position can be changed to the first position and the second position. The intermittent valve 22 is placed in the first state when the piston 30 is located at the first position, and the intermittent valve 22 is placed in the second state when the piston 30 is located at the second position. The first shape part 66 and the second shape part 68 are different in distance from the center C of the cam 56. The intermittent valve device 4 also includes the connection part 26 that connects the cam 56 and the piston 30. The connection part 26 is disposed to be in contact with the circumferential surface 60 of the cam 56. The connection part 26 comes into contact with the first shape part 66 while being shifted in the first direction, so as to shift the piston 30 to the first position, and the connection part 26 comes into contact with the second shape part 68 while being shifted in the second direction, so as to shift the piston 30 to the second position. With such configurations, flexibility in the arrangement of the intermittent valve 22 and the drive unit 24 can be improved.

The intermittent valve device 4 also includes the biasing member 70 that biases the connection part 26 toward the cam 56. Accordingly, the state of connection between the cam 56 and the connection part 26 can be maintained more certainly. This enables the shifting of the piston 30 to follow a change in the trajectory on the circumferential surface 60 more accurately.

The intermittent coating device 1 further includes: the tank 6 that stores the coating material 18; the feed pipe conduit 10 and the return pipe conduit 12 that each connect the tank 6 and the intermittent valve device 4; and the pump 8 provided on the feed pipe conduit 10 to feed the coating material 18 from the tank 6 to the intermittent valve device 4. The coating material 18 is returned to the tank 6 through the return pipe conduit 12 when the intermittent valve device 4 is placed in the second state. Accordingly, even in the state where the discharge of the coating material 18 from the die 2 is stopped, the supply of the coating material 18 to the intermittent valve device 4 can be continued. Therefore, since the pump 8 can be always driven, the system configuration of the intermittent coating device 1 can be simplified.

An exemplary embodiment of the present disclosure has been described in detail. The abovementioned embodiment merely describes a specific example for carrying out the present disclosure. The embodiment is not intended to limit the technical scope of the present disclosure, and various design modifications, including changes, addition, and deletion of constituting elements, may be made to the embodiment without departing from the scope of ideas of the invention defined in the claims. Such an additional embodiment with a design modification added has the effect of the combined embodiment and modifications. In the aforementioned embodiment, matters to which design modifications may be made are emphasized with the expression of "of the present embodiment", "in the present embodiment", or the like, but design modifications may also be made to matters without such expression. Optional combinations of the abovementioned constituting elements may also be employed as additional aspects of the present disclosure. Also, the hatching provided on the cross sections in the drawings is not provided to limit the materials of the objects with the hatching.

In the embodiment, one first shape part 66 and one second shape part 68 are provided on the circumferential surface 60 of the cam 56. However, multiple first shape parts 66 and multiple second shape parts 68 may be provided. When multiple first shape parts 66 and multiple second shape parts 68 are provided, the rotational speed of the cam 56 can be lowered. Also, the number of contacts between each first shape part 66 or each second shape part 68 and the first connection member 62 can be reduced. This can prolong the life of the motor 54 or the cam 56. Also, by adjusting the arrangement of each first shape part 66 and each second shape part 68, the interval between the unapplied parts 16a can be adjusted without changing the rotational speed of the cam 56.

In the embodiment, the cam 56 has a shape such that the second shape part 68 protrudes from the first shape part 66. However, the shape of the cam 56 is not particularly limited. For example, the cam 56 may have a shape such that the second shape part 68 is recessed from the first shape part 66. More specifically, the first shape part 66 may be farther from the center C than the second shape part 68, and the second shape part 68 may be nearer from the center C than the first shape part 66. When such a cam 56 is used, the positional relationship between the cam 56 and the cylinder 28 is determined such that the direction in which the first connection member 62 extends from the second connection member 64 toward the cam 56 is opposite to the direction in which the piston 30 extends from the second connection member 64 toward the cylinder 28, for example. Also, the biasing member 70 is provided to bias the second connection member 64 in the second direction X2.

In the embodiment, the cam 56 and the piston 30 are indirectly connected with each other via the connection part 26. However, the cam 56 and the piston 30 may be directly connected with each other without the intervention of the connection part 26. For example, the cam 56 may be disposed to be in contact with the tip part of the piston 30 protruding from the cylinder 28. Also, the piston 30 may be biased by the biasing member 70 toward the cam 56. In other words, the piston 30 may be biased in the second direction X2. Also, the cam 56 may have a shape such that the second shape part 68 is recessed from the first shape part 66. In this case, when the contact position between the piston 30 and the circumferential surface 60 reaches the first shape part 66 by means of the rotation of the cam 56, the piston 30 is pressed by the cam 56 and shifted in the first direction X1 against the biasing force of the biasing member 70, so as to be set to the first position. When the contact position between the piston 30 and the circumferential surface 60 reaches the second shape part 68, on the other hand, the piston 30 is shifted in the second direction X2 by the biasing force of the biasing member 70, so as to be set to the second position.

In the embodiment, the return pipe conduit 12 is disposed on the side closer to the first opening 32 through which the piston 30 is inserted, and the die supply pipe conduit 14 is disposed on the side farther from the first opening 32. However, the arrangement of the conduits may be opposite. In this case, when the piston 30 is shifted out of the cylinder 28 from the second position, the piston 30 is set to the first position; when the piston 30 is shifted into the cylinder 28 from the first position, the piston 30 is set to the second position.

The invention claimed is:

1. An intermittent valve device, comprising:
   an intermittent valve through which a coating material is supplied to a die that applies the coating material onto a material; and
   a drive unit comprising a cam having has a circumferential surface including a first part and a second part such that the second part gradually rises from a first point of the first part and gradually declines to a second point of the first part,
   the intermittent valve comprising:
      a cylinder comprising:
         a first opening, a second opening, a third opening, a fourth opening, and a fifth opening, wherein the fourth opening is connectable to the die;
         a first flow passage connecting the first opening to the second opening and the third opening;
         a second flow passage connecting the second opening to the fourth opening; and
         a third flow passage connecting the third opening to the fifth opening; and
      a plug coupled to the cam and operable to (1) open the second opening and close the third opening when the plug is couple to the first part of the cam so that the coating material flows from the first opening to the fourth opening through the first flow passage and second flow passage, and (2) close the second opening and open the third opening when the plug is coupled to the second part of the cam so that the coating material flows from the first opening to the fifth opening through the first flow passage and the third flow passage.

2. The intermittent valve device according to claim 1, wherein
   the first part and the second part are different in distance from a center of the cam, and
   the intermittent valve device further comprises a connector having a first end that is in contact with the cam and a second end that has the plug so that the connector moves the plug in accordance with the first part and the second part of the cam.

3. The intermittent valve device according to claim 2, further comprising a biasing member that biases the connector toward the cam.

4. The intermittent valve device according to claim 2, wherein
   a center of the second opening is aligned with a center of the third opening, the plug at the second end of the connecter traverses both the second opening and the third opening, the plug comprising a first part operable to open and close the second opening, and a second part operable to open and close the third opening, and the first part and the second part of the plug are disposed at the second end of the connector to be spaced apart from each other.

5. The intermittent valve device according to claim 1, wherein the material to be coated is a current collector of a secondary battery, and the coating material is electrode slurry of a secondary battery.

6. An intermittent coating device, comprising:

the intermittent valve device according to claim 1;

a tank that stores a coating material;

a feed pipe connecting the tank to the first opening of the intermittent valve;

a pump configured to feed the coating material from the tank to the intermittent valve through the feed pipe;

the die connected to the fourth opening of the intermittent valve to apply the coating material onto the material; and a return pipe connecting the fifth opening of the intermittent valve to the tank.

\* \* \* \* \*